United States Patent [19]

Harris

[11] Patent Number: 5,628,595

[45] Date of Patent: May 13, 1997

[54] WHEELCHAIR LOCK-DOWN DEVICE

[75] Inventor: DuWade N. Harris, Prior Lake, Minn.

[73] Assignee: Associated Partnership Ltd. Inc., Burnsville, Minn.

[21] Appl. No.: 407,967

[22] Filed: Mar. 22, 1995

[51] Int. Cl.$^6$ ................................................. B60P 7/08
[52] U.S. Cl. ................................................. 410/7; 410/4
[58] Field of Search ..................... 410/3, 4, 7, 9, 410/19, 22, 23, 51, 80; 248/503.1, 503, 500; 296/65.1

[56] References Cited

U.S. PATENT DOCUMENTS

| | | |
|---|---|---|
| 1,835,840 | 12/1931 | Barclay ........................ 410/51 X |
| 3,444,949 | 5/1969 | Pollock . |
| 4,062,209 | 12/1977 | Downing et al. ................ 410/3 X |
| 4,265,478 | 5/1981 | Korsgaard .................... 410/23 X |
| 4,389,056 | 6/1983 | Tenniswood ................. 410/23 X |
| 4,457,551 | 7/1984 | Anthony . |
| 4,475,762 | 10/1984 | DeLong et al. . |
| 4,492,403 | 1/1985 | Blomgren et al. . |
| 4,511,171 | 4/1985 | Petersen . |
| 4,601,620 | 7/1986 | Bugger et al. ................. 410/51 X |
| 4,623,289 | 11/1986 | Apostolos . |
| 4,671,713 | 6/1987 | Lenkman . |
| 4,688,843 | 8/1987 | Hall . |
| 4,690,364 | 9/1987 | Constantin . |
| 4,729,573 | 3/1988 | Davis . |
| 4,770,459 | 9/1988 | Nakaiwa et al. . |
| 4,772,164 | 9/1988 | McFarland . |
| 4,805,954 | 2/1989 | Lazaroff . |
| 4,973,022 | 11/1990 | Mayland . |
| 5,026,225 | 6/1991 | McIntyre . |
| 5,186,585 | 2/1993 | Sousa et al. ...................... 410/9 |
| 5,205,601 | 4/1993 | Ferris ............................ 410/7 X |
| 5,344,265 | 9/1994 | Ullman et al. .................. 410/3 |
| 5,489,170 | 2/1996 | Inoue et al. ..................... 410/7 |

Primary Examiner—Karen B. Merritt
Assistant Examiner—Stephen Gordon
Attorney, Agent, or Firm—Merchant, Gould, Smith, Edell, Welter & Schmidt, P.A.

[57] ABSTRACT

The present invention is a device for securing a wheelchair to the floor of a vehicle such as a van or other floor surface. The wheelchair lock-down device includes a locking mechanism mounted on a base plate that, in turn, is mounted to the floor surface. The locking mechanism is made of a stationary locking structure that has a slot, and a moveable locking arm that pivots from a first (open) position to a second (closed) position to confine the bar within the slot. Contact of the wheelchair bar against the locking arm forces the locking arm to pivot upward to the second (closed) position. With that movement, a slidable locking structure slides forward and engages the locking arm to maintain it around the wheelchair bar until a release mechanism is activated. The device includes both manual- and electronically-activated release mechanisms.

10 Claims, 6 Drawing Sheets

WHEELCHAIR LOCK-DOWN DEVICE

FIELD OF THE INVENTION

This invention relates generally to a device for securing and immobilizing a wheelchair to the floor of a vehicle or other floor surface.

BACKGROUND OF THE INVENTION

The unhampered ability to travel from place to place is important to a person's independence and well-being. However, for a person confined to a wheelchair, such opportunities for travel may be limited where vehicular transportation is not readily or conveniently available. In addition, customizing a car or van to make it accessible and safe for transporting a person in a wheelchair can be costly.

Although devices are known for securing a wheelchair in a vehicle, those devices have a number of drawbacks. For example, wheelchair lock-down devices described in U.S. Pat. Nos. 4,623,289, 4,805,954 and 4,973,022, are complex in design and difficult to install within conventional vehicles. Another lock-down device, described in U.S. Pat. No. 4,690,364, requires the wheelchair to be maneuvered into the locking structure in a very precise manner in order to properly engage the device. This causes delays in securing the wheelchair and often requires the assistance of a second person to properly secure the wheelchair in the device.

Therefore, an object of the invention is to provide a wheelchair lock-down device that is easily installed in a conventional vehicle such as a van. Another object is to provide a wheelchair lock-down device that is readily usable by a wheelchair occupant, into which a wheelchair can be easily and quickly engaged and released without requiring the assistance of a second person. Yet another object is to provide a device for locking down a wheelchair that eliminates protrusions such as bars or slide tracks in the cargo area of a van or other vehicle.

SUMMARY OF THE INVENTION

These and other objects are achieved by the present invention which is directed to a device for securing a wheelchair to the floor of a vehicle such as a van or other floor surface.

The wheelchair lock-down device includes a locking mechanism mounted on a base plate that, in turn, is mounted to the floor surface. The locking mechanism is made of a stationary locking structure that has a slot, and a moveable locking arm that pivots from a first (open) position to a second (closed) position to close off the slot. A bar mounted to the underside of the wheelchair is receivable in the slot. Contact of the wheelchair bar against the locking arm forces the locking arm to pivot to the second (closed) position to confine the bar within the slot. At the same time, a slidable locking structure mounted beneath the locking arm slides to engage the underside of the locking arm. This maintains the locking arm in the second (closed) position around the wheelchair bar when the lock-down device is in use until a release mechanism is activated.

The device includes both manual- and electronically-activated release mechanisms that function to move the slidable locking structure forward in the device and disengage the locking arm. This allows the locking arm to pivot back to the first (open) position so that the wheelchair bar can be removed from the slot.

Advantageously, the present lock-down device maintains a wheelchair securely clamped or locked into a stationary position in a van or other vehicle, and prevents the chair from rocking or other like movement while the vehicle is in motion. Another advantage is that a wheelchair user can easily maneuver a wheelchair into engagement with the locking mechanism. The device can be quickly and readily engaged by the user to lock the chair into place and release the chair when desired. Yet another advantage is that the lock down device is streamlined and self-contained and does not require a protrusion from the mechanism bar for latching the chair or a tracking system such as slide tracks mounted to the floor of the vehicle which can interfere with and/or pose a safety hazard to movement by occupants within the vehicle.

BRIEF DESCRIPTION OF THE DRAWINGS

Referring now to the drawings wherein reference numerals generally indicate corresponding parts throughout the several views.

DETAILED DESCRIPTION OF THE PREFERRED EMBODIMENT

Throughout the following description, reference will be made to the drawings and the same numerals will be used throughout the several views to indicate the same or like parts of the invention.

Figure 1:
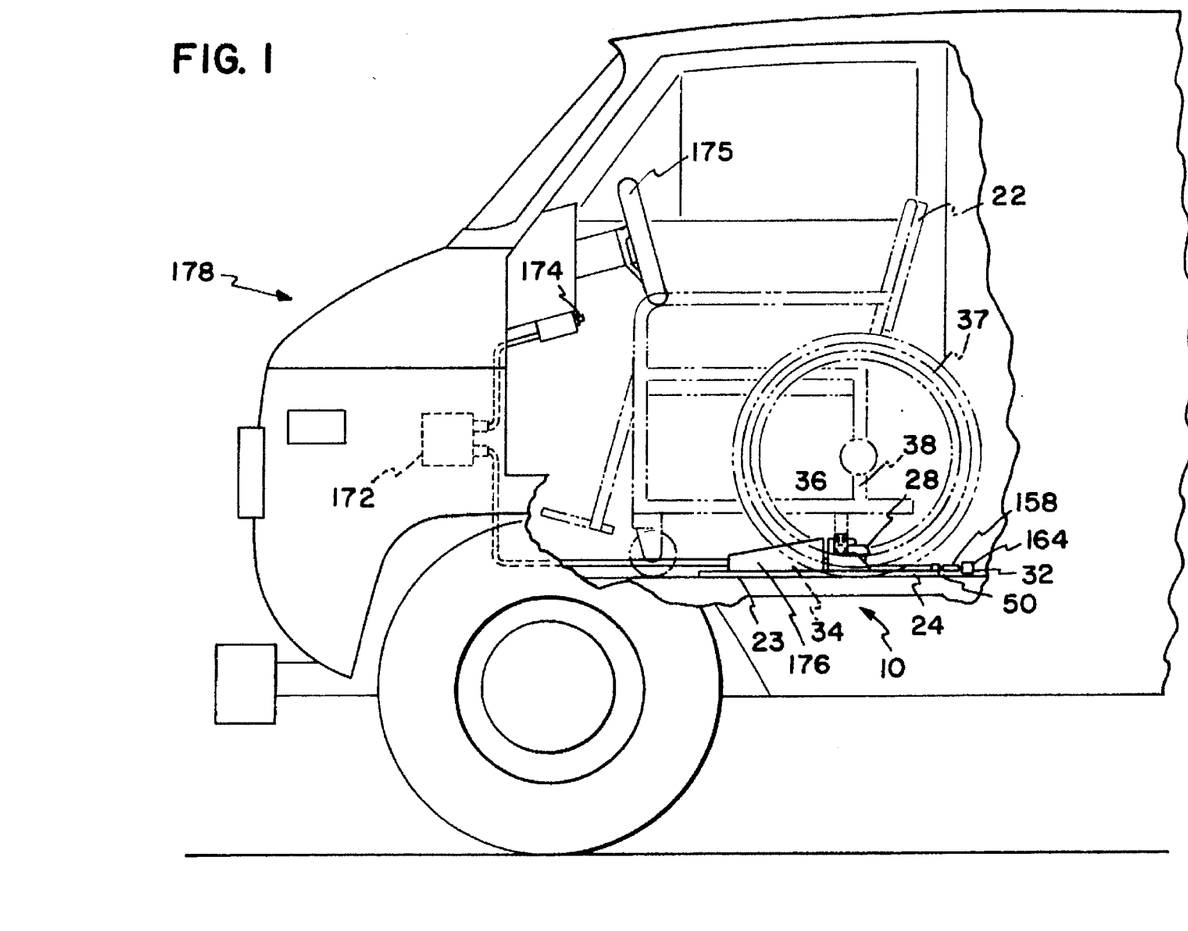
FIG. 1 is a side view of an embodiment of the wheelchair lock-down device of the present invention as installed within a vehicle.
Figure 2A:
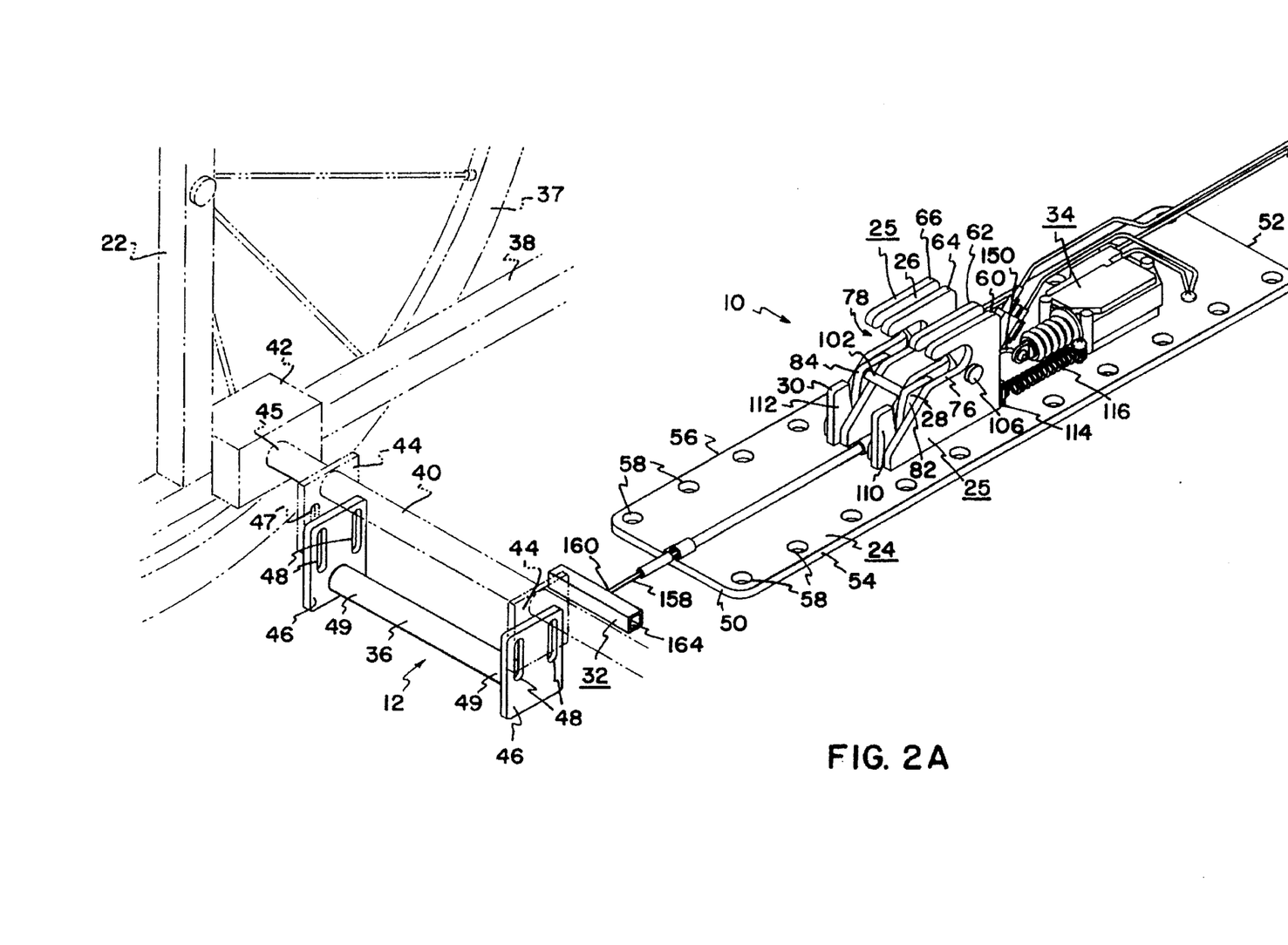
FIG. 2A is a perspective view the wheelchair lock-down device of FIG. 1 in the disengaged (open) position.

FIG. 1 shows a wheelchair lock-down device, shown generally as 10, constructed in accordance with the principles of the present invention for securing a wheelchair 22, mounted to the floor 23 of a vehicle 178. As shown in FIG. 2A, to secure wheelchair 22 within the lock-down device 10, wheelchair 22 is equipped with a bar 36 attached to the underside of the chair 22 between the opposing rear wheels 37 (one shown) and aligned in a plane generally parallel to the floor 23. Wheelchair bar 36 is receivable within locking mechanism 25 of the lock-down device 10.

Figure 2B:
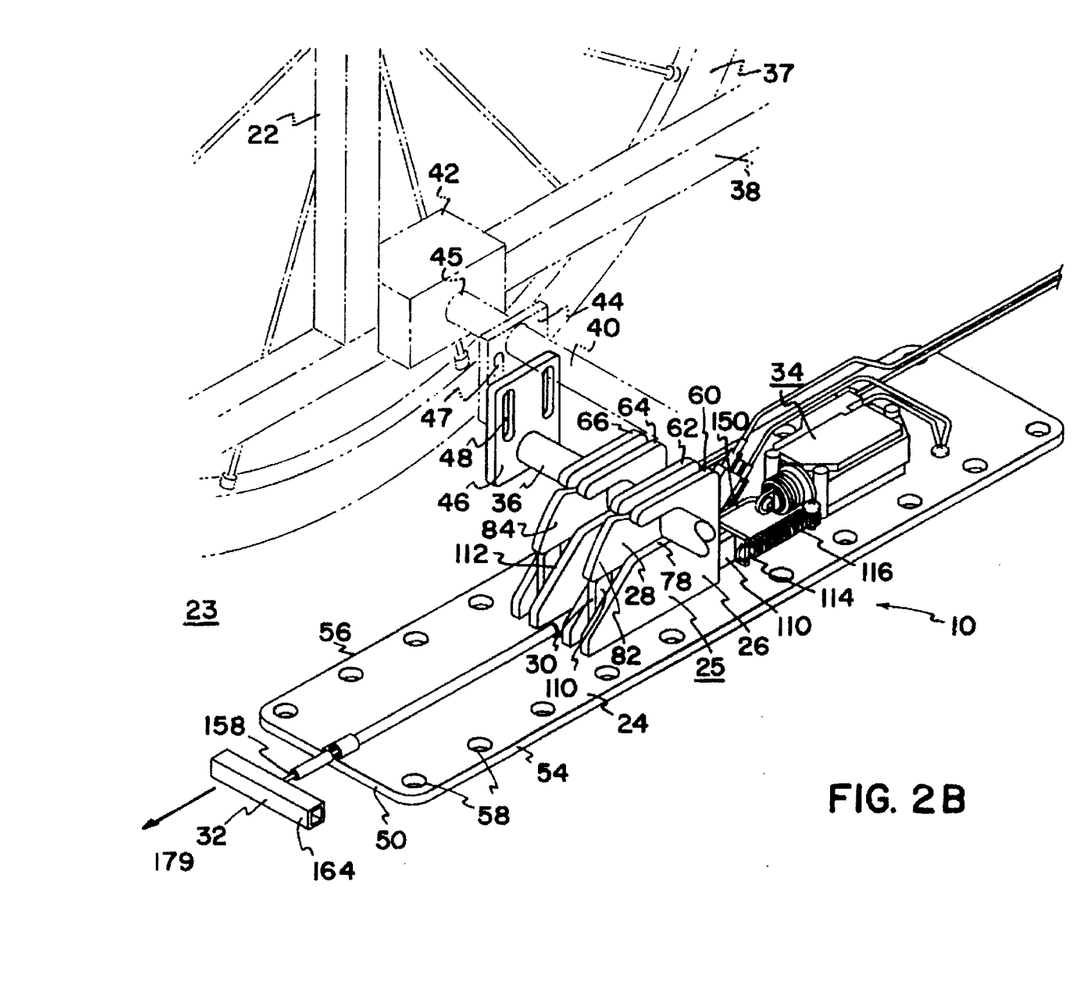
FIG. 2B is a perspective view of the wheelchair lock-down device as of FIG. 1 in the engaged (closed) position.

As depicted in FIGS. 2A and 2B, the lock-down device 10 includes a base plate 24 and a locking mechanism 25. Base plate 24, as shown, is a plate that is generally rectangular in shape, with opposing ends 50, 52, and opposing side edges 54, 56. A plurality of apertures 58 in base plate 24 provide for insertion of fastening means (not shown) to attach the base plate 24 to a floor surface 23.

Locking mechanism 25 is mounted on the base plate 24. Locking mechanism 25 is composed of (i) stationary locking structure 26 and pivotal locking arm 28 which cooperate together to receive and retain wheelchair bar 36; (ii) slidable locking structure 30 which functions to maintain pivotal locking arm 28 in the locked position around wheelchair bar 36; and (iii) release mechanisms 32 (manual), 34 (electronic) which function to release locking arm 28 so that wheelchair bar 36 can be removed from lock-down device 10.

Stationary Locking Structure

As depicted in FIGS. 2A and 2B, stationary locking structure 26 has two pair of locking plates 60, 62 and 64, 66 that are rigidly attached (e.g., welded) at an about perpendicular angle to base plate 24. The locking plates are arranged on base plate 24 in general parallel arrangement, juxtaposed between side edges 54, 56 of base plate 24.

Figure 3A:
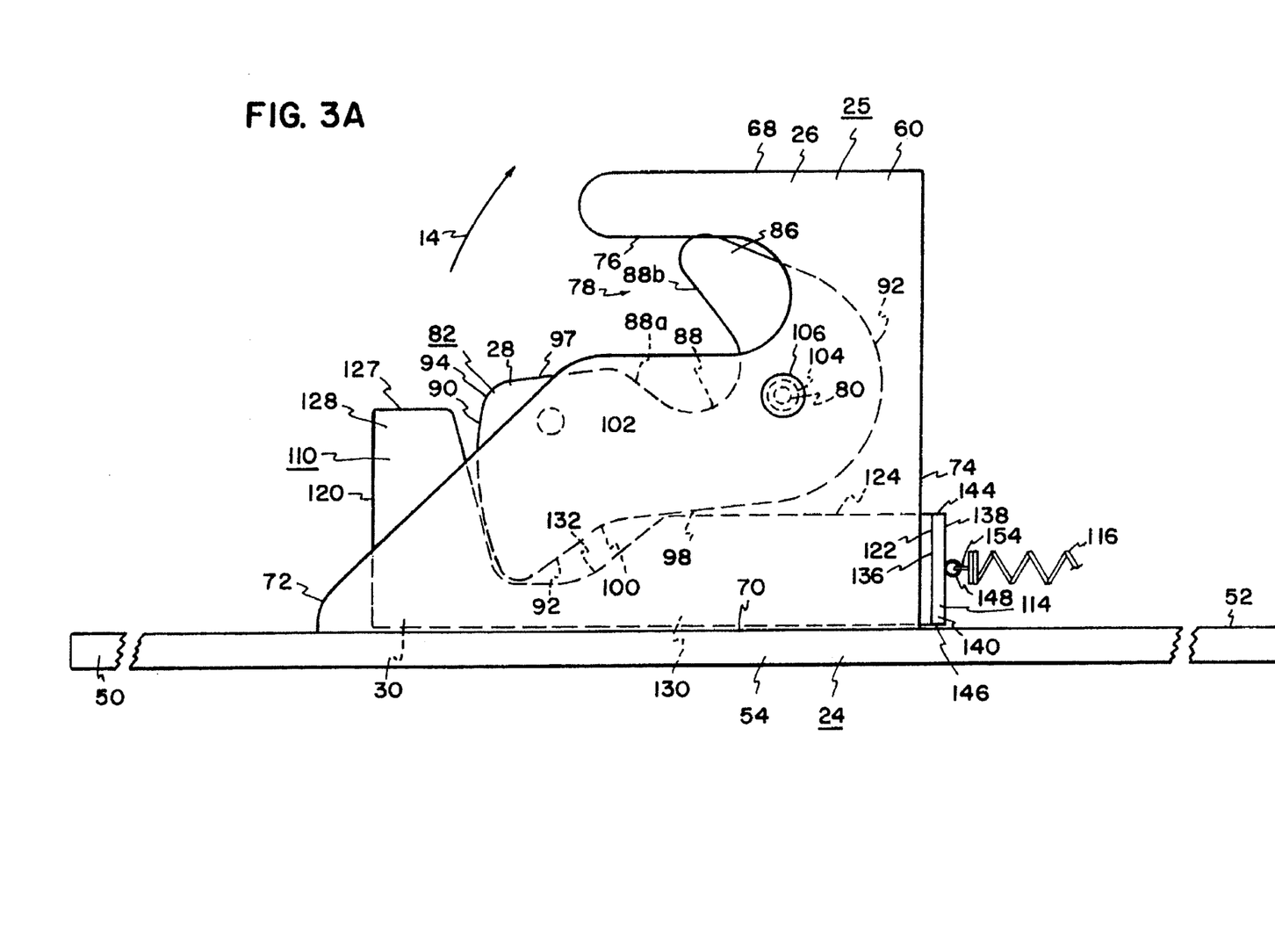
FIG. 3A is a side view of the wheelchair lock-down device of FIG. 1 in the disengaged (open) position.
Figure 3B:
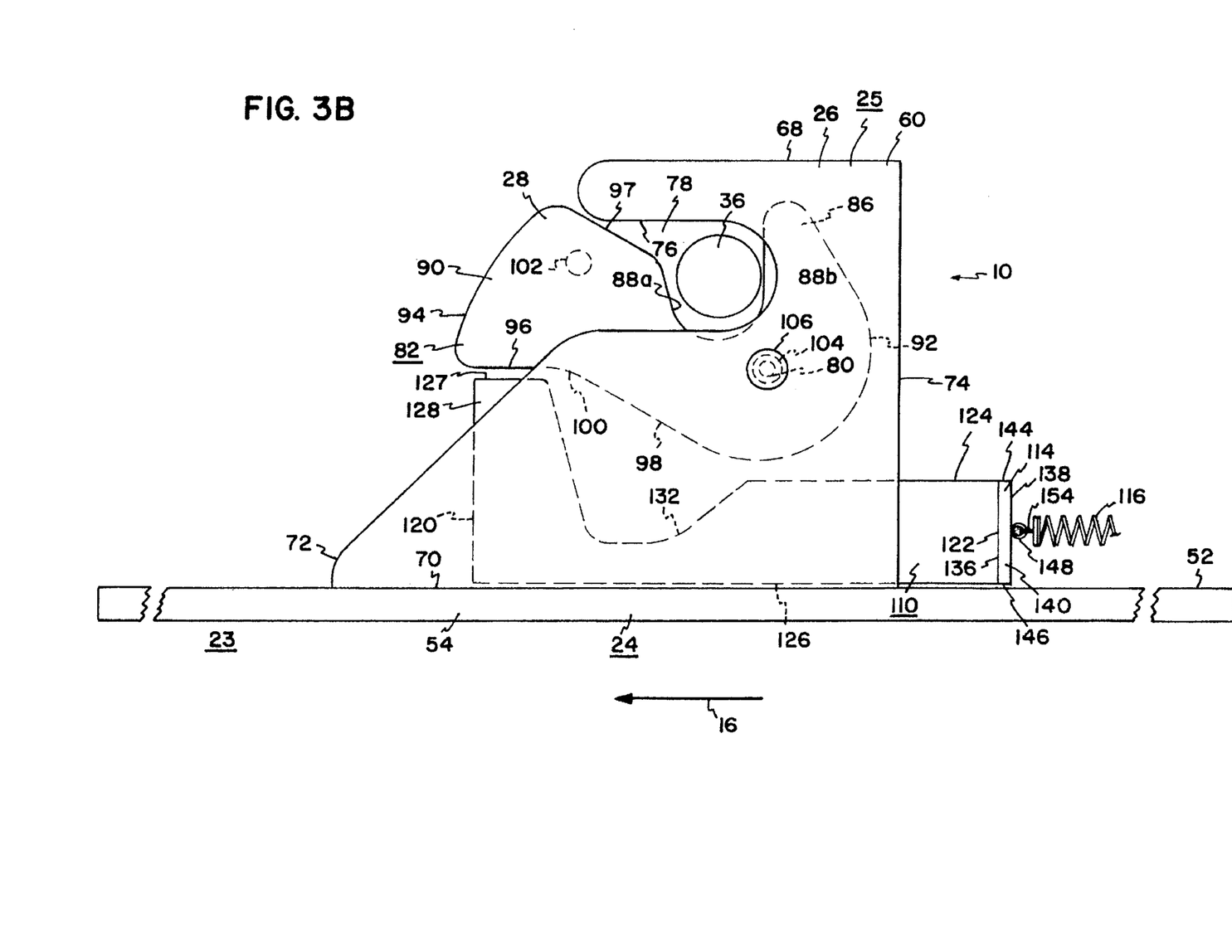
FIG. 3B is a side view of the wheelchair lock-down device of FIG. 1 in the engaged (closed) position.

Referring to FIGS. 3A and 3B, each locking plate 60, 62, 64, 66 (shown as plate 60) includes top and base opposing edges 68, 70 and first and second opposing ends 72, 74. First end 72 of each locking plate (shown as plate 60) has a notch 76 which is generally U-shaped. With locking plates 60, 62, 64, 66 attached to base plate 24, notches 76 are aligned to cooperatively form a slot 78 which is sized and oriented to receive wheelchair bar 36 therein. Slot 78 is oriented in a generally horizontal plane relative the base plate 24. The locking plates 60, 62, 64, 66 are mounted on base plate 24 so that slot 78 of notch 76 is oriented toward first end 50 of base plate 24.

Although the wheelchair lock-down device 10 is depicted in the Figures as having two pair of stationary locking plates 60, 62, and 64, 66, it will be appreciated that other embodiments made with one pair or more than two pair of locking plates is within the scope of the invention.

Pivotal Locking Arm

Pivotally attached to locking plates 60, 62 and 64, 66 is pivotal locking arm 28. Pivotal locking arm 28 cooperates with the stationary locking structure 26 to receive and retain the wheelchair bar 36 within the opening or slot 78 of notch 76.

Figure 4:
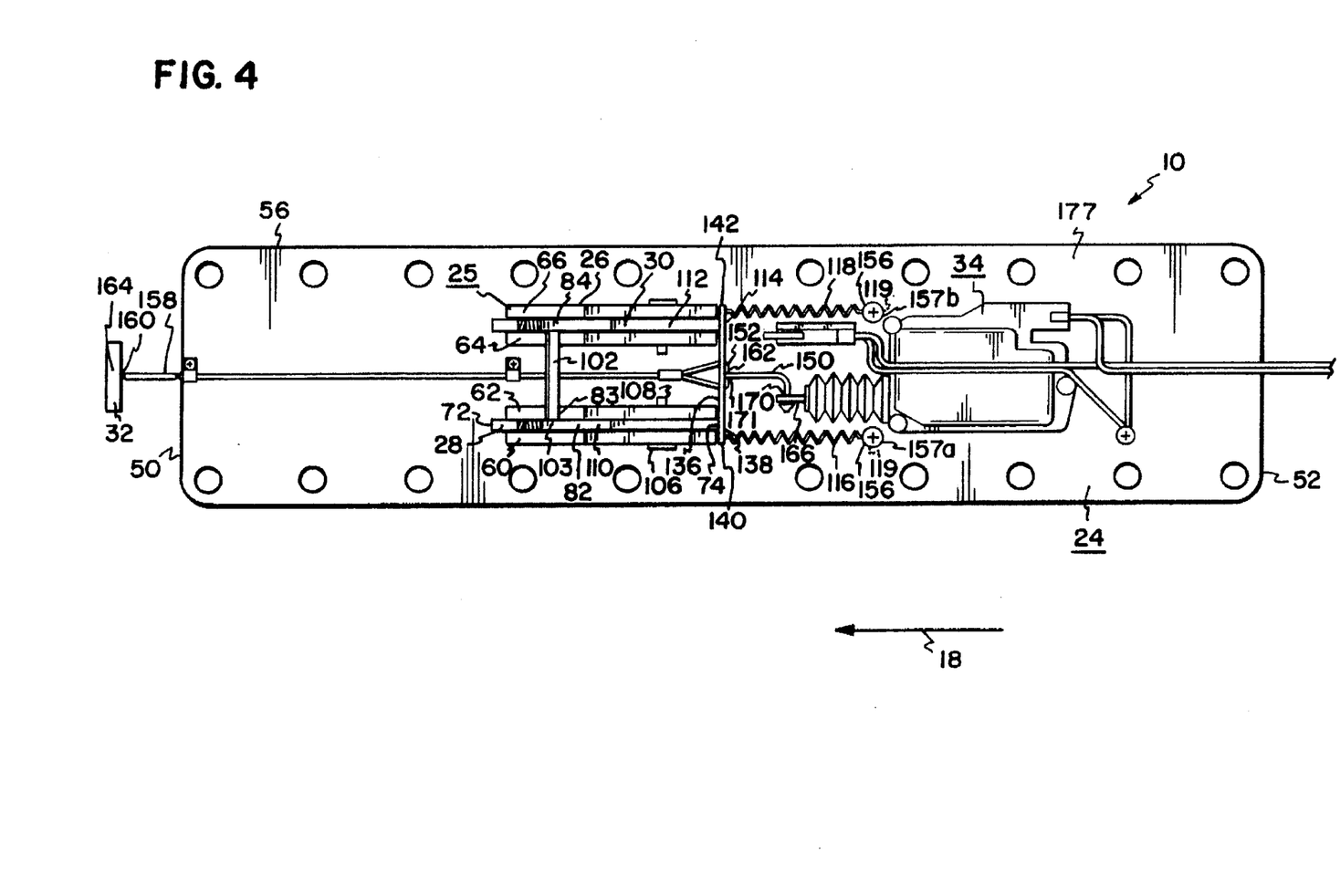
FIG. 4 is a top view of the wheelchair lock-down device of FIG. 1.

As shown in FIGS. 2A and 2B, pivotal locking arm 28 includes first and second arm members 82, 84, positioned respectively between locking plates 60, 62 and locking plates 64, 66, in opposing parallel arrangement. Arm members 82, 84 are connected to each other by restraining member 102 which, as shown, is generally a cylindrical bar with ends 103 attached to sides 83 of each arm members 82, 84, as shown in FIG. 4. Each locking plate includes an aperture 104, and each locking arm member 82, 84 includes an aperture 80. Locking arm members 82, 84 and locking plates 60, 62 are positioned in relation to each other with apertures 80 and 104 coaxially aligned. Apertures 80, 104 are sized for receiving means for pivotally mounting the arm member to the locking plate therethrough, such as a bolt or other fastener.

As depicted in FIGS. 3A and 3B, locking arm members 82, 84 (member 82 depicted) are advantageously configured as hook-shaped plates with an extension portion 86, an arcuate portion 88 that is sized to receive the wheelchair bar 36 therein, and a basal portion 90. Arm members 82, 84 include opposing first and second ends 92, 94, and opposing top and base edges 97, 98. Proximate to basal portion 90, base edge 98 forms an obtuse angle 100 to form an extension 96.

Slidable Locking Structure

Positioned beneath each of the locking arm members 82, 84, is slidable locking structure 30 that functions to maintain the locking arm members in the fixed, locked position (FIGS. 2B, 3B). Referring to FIGS. 3A, 3B and 4, locking structure 30 is composed of first and second sliding members 110, 112, and a connecting member 114 thereinbetween.

Sliding members 110, 112 are shown generally in FIGS. 3A–3B as an L-shaped plate (sliding member 110 depicted). Each sliding member 110, 112, has opposing first and second ends 120, 122, top and base edges 124, 126, an extension portion 128 at first end 120, and a base portion 130. Top edge 124 of sliding members 110, 112, includes a recess portion 132 configured to receive extension 96 of a locking arm member 82, 84, therein.

Connecting member 114 is generally a rectangular-shaped plate with first and second sides 136, 138, first and second ends 140, 142, and top and base edges 144, 146. Connecting member 114 further includes a pair of notches 148 on second side 138 adjacent each end 140, 142, that are operable to receive and attach a spring 116, 118. First and second springs 116, 118 can be conventional springs that have a loop portion (not shown) at each end 154, 156 (FIG. 4). Springs 116, 118 are attached to connecting member 114 by hooking the loop portion at end 154 through spring notch 148.

Locking structure 30 is assembled by welding or otherwise attaching each second end 122 of sliding member 110, 112 to first side 136 of connecting member 114 at either end 140, 142, such that base edge 146 of connecting member 114 is substantially flush with base edges 126 of sliding members 110, 112.

Release mechanisms

The lock-down device 10 further includes a manual release mechanism 32 and an electronic release mechanism 34. The release mechanisms 32, 34 are operable to disengage locking structure 30, and enable locking arms 28 to pivot from the second (closed) position to the first (open) position, so that the wheelchair bar 36 can be removed from slot 78 of lock-down device 10.

As depicted in FIG. 4, the manual release mechanism 32 includes a handle 164 attached to end 160 of cable 158. End 162 of cable 158 is attached to connecting member 114 of locking structure 30, for example, by looping end 162 through a pair of apertures 152 in connecting member 114, as shown. As assembled in device 10, cable 158 extends perpendicularly from first side 136 of connecting member 114 between the two pairs of locking plates in the direction toward first end 50 of base plate 24.

As also shown in FIG. 4, an electronic release mechanism 34 is mounted to base plate 24 proximate second end 52. As depicted, electronic release mechanism 34 is a conventional electric solenoid with a selectively moveable release arm 166. An angled member 150, shown generally as an L-shaped extension, is attached at end 170 to the release arm 166, and at end 171 to connecting member 114. Angled member 150 functions to provide a connection between locking structure 30 and the release arm 166. As shown, angled member 150 is attached to second side 138 of connecting member 114 at about the midpoint between first and second ends 140, 142, and at an about perpendicular angle to connecting member 114.

Assembly

Referring to FIGS. 2A, 2B and 3A, to assemble and mount locking mechanism 25 on base plate 24, locking plates 60, 62, 64, 66 are mounted (i.e., welded) at an about perpendicular angle to base plate 24 in a general parallel arrangement between side edges 54, 56 of base plate 24. Next, sliding members 110, 112 are inserted, respectively, between locking plates 60,62 and 64,66, with first side 136 of connecting member 114 placed flush against edges 74 of locking plates 60, 62, 64, 66.

Arm members 82, 84 of pivotal locking arm 28 are then inserted between locking plates 60,62 and 64,66, respectively, and above sliding members 110. Restraining member 102 (which connects arm members 82, 84) is oriented toward first end 50 of base plate 24. Arm members 82, 84 are placed with extension 96 positioned in recess 132 of each of the sliding members 110, 112. Apertures 104 of the locking plates and apertures 80 of the locking arm members 82, 84 are coaxially aligned, and pivotal mounting means 106 (i.e., bolts) are inserted therethrough. Bolts 106 or other suitable mounting means can be secured, for example, with a threaded mateable nut, a locking pin 108 as depicted in FIG. 4, or other suitable means.

Referring to FIG. 4, cable 158 is attached to connecting member 114 of locking structure 30, as described above. The electronic release mechanism 34 is mounted to base plate 24 proximate second end 52. Angled member 150 of release mechanism 34 is fastened to second side 138 of connecting member 114 at about midpoint between first and second ends 142, 144, and at an about perpendicular angle to connecting member 114.

The looped second ends 119 of springs, 116, 118 that extend from connecting member 114, are then affixed to base plate 24 at about position 157a, 157b, respectively. The springs 116, 118 can be attached by conventional techniques, for example by inserting screws through the looped second ends 119 and threading the screws into openings (not shown) tapped into the base plate 24.

The components of lock-down device 10, including base plate 24, locking plates 60, 62, 64, 66, arm members 82, 84 and sliding members 110, 112, are preferably constructed of steel or other rigid material having a similar strength and hardness.

Outer Casing

The lock-down device 10 can further include a protective outer casing 176, shown generally in FIG. 1 as a channel-shaped box that is placed over the electronic release mechanism 34 and attached to the base plate 24 by conventional fastening means. As shown, outer casing 176 extends generally from second ends 74 of locking plates 60, 62, 64, 66 to about location 177 in proximity to end 52 of the base plate 24 (FIG. 4). The outer casing 176 can be constructed, for example, of steel or other rigid material with a similar strength and hardness.

Wheelchair Bar Assembly

As depicted in FIG. 2A, to facilitate attachment of the wheelchair bar 36 to the wheelchair frame 38, bar 36 will have an attachment assembly shown generally as 12. Wheelchair bar 36 is generally cylindrical with ends 49. A pair of end plates 46 are attached (i.e., welded) to either ends 49 of bar 36.

The attachment assembly 12 includes an extension member 40, two end brackets 42 (one shown), two central plates 44, and two end plates 46. As shown, the extension member 40 is generally cylindrical bar with ends 45 (one shown) that are attached to the frame 38 of the wheelchair 22 by a pair of conventional bolted end brackets 42 (one shown). The extension member 40 is aligned generally parallel to the floor surface 23 and extends between opposing wheels 37 (one shown) of the wheelchair 22.

The pair of central plates 44 are rigidly attached, for example, by welding, onto extension member 40 so that plates 44 extend from extension member 40 in a downward orientation toward floor 23. The distance between plates 44 is about the length of wheelchair bar 36 with attached end plates 46.

The central plates 44 of the extension member 40, and the end plates 46 of the wheelchair bar 36, include apertures 47, 48, respectively. The end plates 46 are placed flush against the two central plates 44 so that apertures 47, 48, are co-axially aligned. The end plates 46 of wheelchair bar 36 are then secured to the central plates 44 by inserting a bolt or other fastening means (not shown) through apertures 47, 48. The apertures 47, 48 are preferably vertically elongated so that the distance of the wheelchair bar 36 above the floor surface 23 may be vertically adjusted.

The components of the wheelchair attachment assembly can be constructed of steel or other like material.

Installation

In general, lock-down device 10 is positioned in vehicle 178 with first end 50 of base plate 24 oriented in the direction in which a wheelchair would approach the device.

As shown in FIG. 1, a common location for lock-down device 10 is adjacent the steering wheel 175 of a vehicle 178, the conventional drivers seat having been removed. When secured by lock-down device 10, wheelchair 22 is positioned to enable a wheelchair occupant to operate the vehicle 178. In particular, lock-down device 10 is positioned and mounted onto floor 23 of vehicle 178 such that a wheelchair 22 can be maneuvered past first end 50 of base plate 24 towards slot 78 (not shown), wherein wheelchair bar 36 can be readily and easily inserted into slot 78.

To install the lock-down device 10 to the floor of a vehicle or other floor surface, base plate 24 is mounted to floor 23 with bolts or other fastening means. It will be appreciated that any number of conventional attachment methods commonly known in the art could be used to secure the base plate to the floor surface. For example, a common attachment method utilizes bolts, screws or other fastening means inserted through the plate apertures of the base plate and received by floor surface apertures (not shown) drilled in the floor of the vehicle.

Electronic release mechanism 34 is installed to be in electrical communication with a conventional electronic control box 172. Control box 172 is electrically connected to a vehicle's electrical system (not shown) and receives input from a manual control button 174, shown mounted below the dashboard, which is operable to activate the electronic release mechanism 34.

Use

In general operation, pivotal locking arm 28 is moveable between a first (open) position shown in FIGS. 2A and 3A, in which slot 78 is open and operable to receive a wheelchair bar 36 therein, and a second (closed) position shown in FIGS. 2B and 3B, in which slot 78 is closed off by basal portion 90 of arm members 82, 84, and the bar 36 is engaged within the device.

With lock-down device 10 in the open or disengaged position (FIGS. 2A, 3A), slot 78 of the stationary locking 26 structure is open and operable to receive the wheelchair bar 36 therein. Locking structure 30 is positioned with first side 136 of connecting member 114 placed flush against second ends 74 of each of the locking plates 60, 62, 64, 66. In that position, sliding members 110, 112, of locking structure 30 are arranged with extension portions 128 proximate to first end 72 of locking plates 60, 62, 64, 66.

In addition, the pivotal locking arm 28 is positioned in relation to sliding members 110, 112, as follows: (i) basal portions 90 and extensions 96 of arm members 82, 84 are placed into recess portions 132 of sliding members 110, 112; (ii) restraining member 102 (which connects arm members 82, 84) is oriented toward first end 50 of base plate 24; and (iii) end surfaces 94 and extension surfaces 96 of arm members 82, 84 are biased, respectively, against extension portions 128 and edges 124 of sliding members 110, 112.

To use locking device 10 in a vehicle 178, a wheelchair 22 is lifted or rolled up a ramp into the vehicle 178, and moved toward lock-down device 10 such that wheelchair bar 36 is aligned with slot 78 of the stationary locking structure 26. Wheelchair 22 is moved toward lock-down device 10 wherein the wheelchair bar 36 is inserted into slot 78. As the wheelchair bar 36 is moved into slot 78, the wheelchair bar 36 is placed into contact with arcuate surfaces 88b and extension portions 86 to cause arm members 82, 84 to pivot about the pivot bolts 106 in the direction of arrow 14 (FIG. 3A) to the second (closed) position.

With lock-down device 10 in the closed or engaged position (FIGS. 2B, 3B), slot 78 of the stationary locking structure 26 is obstructed and operable to retain the wheelchair bar 36 therein. Wheelchair bar 36 is engaged by arcuate portions 88a, 88b of arm members 82, 84 and confined within slot 78 of stationary locking structure 26.

In the closed/engaged position, locking structure 30 is positioned with first side 136 of connecting member 114 having been displaced from second ends 74 of each of the locking plates 60, 62, 64, 66 in the direction of arrow 16 (FIG. 3B). In that position, sliding members 110, 112, of locking structure 30 are arranged with extension portions 128 displaced a distance away from first end 72 of locking plates 60, 62, 64, 66.

Pivotal locking arm 28 in the closed position, is positioned in relation to sliding members 110, 112, as follows: (i) basal portions 90 and extensions 96 of arm members 82, 84 are placed above extension portion 128 of sliding members 110, 112, with base edge 98 in contact with edge 127 of extension portion 128; and (ii) restraining member 102 (which connects arm members 82, 84) is placed in close proximity to top edge 68 of locking plates 60, 62, 64, 66. The positioning of pivotal locking arm 28 relative to sliding members 110, 112, prevents arm members 82, 84 from pivoting from the second (closed) position (FIGS. 2B, 3B) back to the first (open) position (FIGS. 2A, 3A). In addition, the contact of restraining member 102 (between arm members 82, 84) against locking plates 62, 64, stops continued movement of pivotal locking arm 28 in the direction of arrow 14 (FIG. 3A) and prevents over-rotation of arm members 82, 84.

After use, the wheelchair lock-down device 10 can be disengaged either manually or electronically. To disengage the lock-down device 10 manually, handle 164 and cable 158 are pulled in the general direction shown by arrow 179 in FIG. 2B. When cable 158 is pulled, sliding members 110, 112 are displaced toward first end 50 of base plate 24 which, in turn, displaces extension portions 128 from beneath extension 96 of arm members 82, 84. This action allows arm members 82, 84 to pivot in the opposite direction of arrow 14 (FIG. 3A) when contacted by wheelchair bar 36 against the arcuate portions 88a as wheelchair 22 is moved away from the lock-down device 10.

The wheelchair lock-down device 10 can be electronically disengaged by actuating the electronic release mechanism 34. Control button 174 (FIG. 1) is pressed to signal the control box 172 to electronically actuate the electronic release mechanism 34 which, in turn, actuates release arm 166 and angled member 150 to move in the direction of arrow 18 (FIG. 4), thus placing tension on springs 116, 118 of slidable locking structure 30. In turn, extension portions 128 of sliding members 110, 112, move in the direction of arrow 16 (FIG. 3B), causing extension portions 128 to become displaced from beneath extension 96. This allows arm members 82, 84, to pivot back to the first (open) position (FIG. 3A), upon contact of wheelchair bar 36 against lower arcuate portions 88a as wheelchair 22 is moved away from the lock-down device 10.

It is to be understood that even though numerous characteristics and advantages of the invention have been set forth in the foregoing description, together with details of the structure and function of the invention, the disclosure is illustrative only, and changes may be made in detail, especially in matters of shape, size and arrangement of the parts within the principles of the invention to the full extent indicated by the broad general meaning of the terms in which the appended claims are expressed.

What is claimed is:

1. A wheelchair lock-down device comprising:
  a) a base plate being attachable to a floor;
  b) a stationary locking structure mounted on the base plate and defining a slot aligned and sized to receive a bar connected to a wheelchair and oriented in a generally parallel plane relative to the floor, wherein the stationary locking structure comprises two pair of locking plates attached in parallel arrangement to the base plate, each locking plate including a notch, the notches aligned to cooperatively form the slot;
  c) an arm member pivotally connected to the stationary locking structure and pivotally moveable between a first and a second position upon engagement with said wheelchair bar; wherein the arm member is generally hook-shaped with an arcuate portion for receiving and confining the bar within the slot, and a basal portion for engagement with the locking mechanism; and when the arm member is in the first position, the slot is open and operable to receive the bar, and when the arm member is in the second position, the slot is closed and operable to confine the bar therein;
  d) a slidable locking mechanism adapted for maintaining the arm member in the second position; and
  e) a release mechanism adapted for disengaging the locking mechanism whereupon the arm member is pivotally moveable from the second position to the first position, and the bar is removable from the slot.

2. The lock-down device of claim 1, wherein the release mechanism is an electronic device connected to the locking mechanism, and operable to disengage the locking mechanism when electronically actuated.

3. The lock-down device of claim 1, wherein the release mechanism comprises a cable connected to the locking mechanism, and operable to disengage the locking mechanism when the release mechanism is manually pulled.

4. The lock-down device of claim 1, wherein the locking mechanism comprises a sliding member adapted to move to a position adjacent to said basal portion of the arm member to rigidly maintain the arm member in the second position.

5. The lock-down device of claim 4, wherein the sliding member comprises an extension portion and a base portion, the base portion including a recess;
  the extension portion adapted to maintain the basal portion of the arm member in a static position when the device is in said second position; and
  the recess of the base portion adapted to receive the basal portion of the arm member therein when the device is in said first position.

6. The lock-down device of claim 4, wherein the locking mechanism further comprises a spring assembly connected to the locking mechanism;
  the spring assembly operable to displace the slidable locking mechanism from a first position to a second position;

wherein in the first position, the sliding member of the locking mechanism is operable to maintain the arm member in said first position; and in the second position, the sliding member is operable to maintain the arm member in said second position.

7. A wheelchair lock-down device comprising:

a) a base plate being attachable to a floor;

b) a stationary locking structure mounted on the base plate; the stationary locking structure composed of first and second pairs of opposing locking plates attached to the base plate in parallel arrangement; the locking plates defining a slot aligned and sized to receive a bar connected to a wheelchair and oriented in a generally parallel plane relative to the floor;

c) a pivotal locking structure including a first arm member pivotally connected between the first pair of locking plates and a second arm member pivotally connected between the second pair of locking plates;

the arm members being pivotally moveable between first and second positions; wherein when the arm members are in the first position, the slot is open and operable to receive the bar, and when the arm members are in the second position, the slot is closed and operable to confine the bar therein;

d) a locking mechanism adapted for maintaining the arm members in the second position; and e) a release mechanism adapted for disengaging the locking mechanism whereupon the arm members are pivotally moveable from the second position to the first position and the bar is removable from the slots.

8. The lock-down device of claim 7, wherein the first arm member is connected to the second arm member by a restraining member operable to prevent the first and second arm members from pivoting beyond the second position.

9. A wheelchair lock-down device comprising:

a) a base plate being attachable to a floor;

b) a stationary locking structure mounted on the base plate and defining a slot aligned and sized to receive a bar connected to a wheelchair and oriented in a generally parallel plane relative to the floor;

c) an arm member pivotally connected to the stationary locking structure and pivotally moveable between a first and a second position upon engagement with said wheelchair bar; wherein the arm member is generally hook-shaped with an arcuate portion for receiving and confining the bar within the slot, and a basal portion for engagement with the locking mechanism, and when the arm member is in the first position, the slot is open and operable to receive the bar, and when the arm member is in the second position, the slot is closed and operable to confine the bar therein;

d) a slidable locking mechanism adapted for maintaining the arm member in the second position; and wherein the locking mechanism comprises a sliding member adapted to move to a position adjacent to said basal portion of the arm member to rigidly maintain the arm member in the second position, and a spring assembly connected to the locking mechanism;

the sliding member comprising an extension portion and a base portion, the base portion including a recess; the extension portion adapted to maintain the basal portion of the arm member in a static position when the device is in said second position; and the recess of the base portion adapted to receive the basal portion of the arm member therein when the device is in said first position; and the spring assembly operable to displace the slidable locking mechanism from a first position to a second position, wherein in the first position, the sliding member of the locking mechanism is operable to maintain the arm member in said first position, and in the second position, the sliding member is operable to maintain the arm member in said second position; and e) a release mechanism adapted for disengaging the locking mechanism whereupon the arm member is pivotally moveable from the second position to the first position, and the bar is removable from the slot.

10. The lock-down device of claim 9, wherein the stationary locking structure comprises two pair of locking plates attached in parallel arrangement to the base plate, each locking plate including a notch, the notches aligned to cooperatively form the slot.

* * * * *